(12) United States Patent
Kurapati et al.

(10) Patent No.: US 8,856,594 B2
(45) Date of Patent: Oct. 7, 2014

(54) METHOD AND SYSTEM FOR AN END-TO-END SOLUTION IN A TEST AUTOMATION FRAMEWORK

(75) Inventors: Pavan Kumar Kurapati, Bangalore (IN); Sanjay Kumar Misra, Bangalore (IN); Shaijo Mohan, Kannur (IN)

(73) Assignee: Infosys Limited, Bangalore (IN)

(*) Notice: Subject to any disclaimer, the term of this patent is extended or adjusted under 35 U.S.C. 154(b) by 261 days.

(21) Appl. No.: 13/246,683

(22) Filed: Sep. 27, 2011

(65) Prior Publication Data

US 2013/0007522 A1 Jan. 3, 2013

(30) Foreign Application Priority Data

Jun. 29, 2011 (IN) .......................... 2194/CHE/2011

(51) Int. Cl.
*G06F 11/00* (2006.01)
*G06F 11/36* (2006.01)
*G06F 11/22* (2006.01)

(52) U.S. Cl.
CPC ........ *G06F 11/3672* (2013.01); *G06F 11/3688* (2013.01); *G06F 11/3664* (2013.01); *G06F 11/2294* (2013.01)

USPC ........................................................... 714/27

(58) Field of Classification Search
CPC G06F 11/3688; G06F 11/2205; G06F 11/267
USPC ..................................................... 714/27, 32
See application file for complete search history.

(56) References Cited

U.S. PATENT DOCUMENTS 6,269,330 B1 * 7/2001 Cidon et al. ..................... 714/43
2008/0313491 A1 * 12/2008 Adams et al. .................... 714/4

* cited by examiner

*Primary Examiner* — Yair Leibovich
(74) *Attorney, Agent, or Firm* — Klarquist Sparkman, LLP

(57) ABSTRACT

Disclosed herein are methods, systems, and computer programs for providing an end-to-end solution in a test automation framework present in a communication network. A user can select at least one test script corresponding to a network service. The selected test script can be executed over a topology that can be generated by the user. The topology can be generated by a simple drag and drop function. Once, the selected test script is executed, a log report can be generated that includes details associated with the executed test script. The method can also facilitate reserving of the topology so that it can be used at a later point in time. The scripts can be generated automatically without user intervention.

28 Claims, 4 Drawing Sheets

METHOD AND SYSTEM FOR AN END-TO-END SOLUTION IN A TEST AUTOMATION FRAMEWORK

CROSS REFERENCE TO RELATED APPLICATION

This application claims the benefit of and priority to prior Indian patent application number 2194/CHE/2011, entitled "METHOD AND SYSTEM FOR AN END-TO-END SOLUTION IN A TEST AUTOMATION FRAMEWORK," filed on Jun. 29, 2011, the entire disclosure of which is hereby incorporated herein by reference.

FIELD

The present invention relates to providing an end-to-end solution in a test automation framework present in a communication network.

BACKGROUND

A communication network may include a number of devices such as routers, switches, and servers. These devices can operate individually or can be interconnected through wireless or wired connections to provide various network services to one or more users. These network services may include, but are not limited to, voice, data, and video services which are supported by various software applications. Therefore, it is important that these devices and the services running over the communication network are thoroughly tested. In addition to testing the individual devices, it is important to test interconnections of different network devices.

Typically, a test cycle includes multiple phases to test a device, its services, and the communication network from various aspects. Currently, there are two methods for testing a device and its associated network service: manual testing and automated testing. Manual testing methods are disadvantageous in a number of ways. First, manual testing is cost and time inefficient as it requires a skilled professional to manually perform the multiple phases of testing. Second, the manual methods for testing are prone to human error. Therefore, automated methods and systems for testing the devices and their associated network services are preferred over the conventional manual methods and systems.

Currently, there are numerous automated methods and systems for testing the devices and their associated network services. These automated methods and systems are also disadvantageous in a number of ways. First, these methods provide solutions for only a particular type of network service. For example, these methods may provide solutions for either voice or data or video services. Second, these methods may not be sufficient to provide testing solutions in case the devices present in the network are provided by more than one vendor. Therefore, they may not be capable of providing solutions for testing devices from multiple vendors at the same time. In addition, another disadvantage of the existing systems is that they are independent in nature and do not provide a comprehensive one-stop solution for the user and/or tester. Examples of such independent systems are the systems integrating with the various defect management modules and the test management modules. Another example of such an independent system is a system that facilitates the creation of scripts for testing a particular network service which is provided by a particular device present in the communication network. In light of the foregoing discussion, there is a need for a method and system to provide an end-to-end solution in a test automation framework.

SUMMARY

One exemplary method disclosed herein is for providing an end-to-end solution in a test automation framework present in a communication network. The communication network includes one or more users and one or more devices that provide at least one network service from a number of network services. The method comprises selecting at least one test script from a number of test scripts by the users. The at least one test script is selected corresponding to the at least one network service, which can be a voice service, a data service, and/or a video service provided by the one or more devices. The method further comprises selecting a topology corresponding to the at least one test script. The topology can be defined as an interconnection among the one or more devices in the communication network. The method further comprises executing the at least one test script on the selected topology and generating a log report that includes details associated with the executed test script.

Another exemplary method disclosed herein is a method for providing an end-to-end solution in a test automation framework present in a communication network that includes one or more users and one or more devices, wherein the one or more devices provides at least one network service from a number of network services. The method includes developing a number of program codes. The program codes are developed for a respective test case from a number of test cases. Further, the program codes are developed according to one or more respective predefined technical standards. The test cases are stored at an execution server, and the at least one test case from the number of test cases is selected by users. The at least one test case is selected corresponding to the at least one network service provided by the devices. The at least one network service can be a voice service, a data service, and/or a video service. A topology corresponding to the at least one test case can be selected and the at least one test case can be executed on the topology using the developed program codes.

An exemplary system disclosed herein is for to providing an end-to-end solution in a test automation framework present in a communication network which includes one or more users and one or more devices. The one or more devices provide at least one network service from a number of network services. The system includes a script generator configured for selecting at least one program code corresponding to a test case and generating at least one test script based on the at least one program code. The system also includes a script selector configured for selecting the at least one test script from a plurality of test scripts by the one or more users using a graphical user interface, the at least one test script corresponding to the at least one network service, which can be a voice service, a data service, and/or a video service provided by the devices. The system further includes a topology module configured for selecting a topology corresponding to the at least one test script. The topology module generates the topology prior to facilitating the selection of the topology corresponding to the at least one test script. An execution server is configured for executing the at least one test script on the selected topology. Further, the execution server can be configured for generating a log report comprising details associated with the executed test script.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Figure 1:
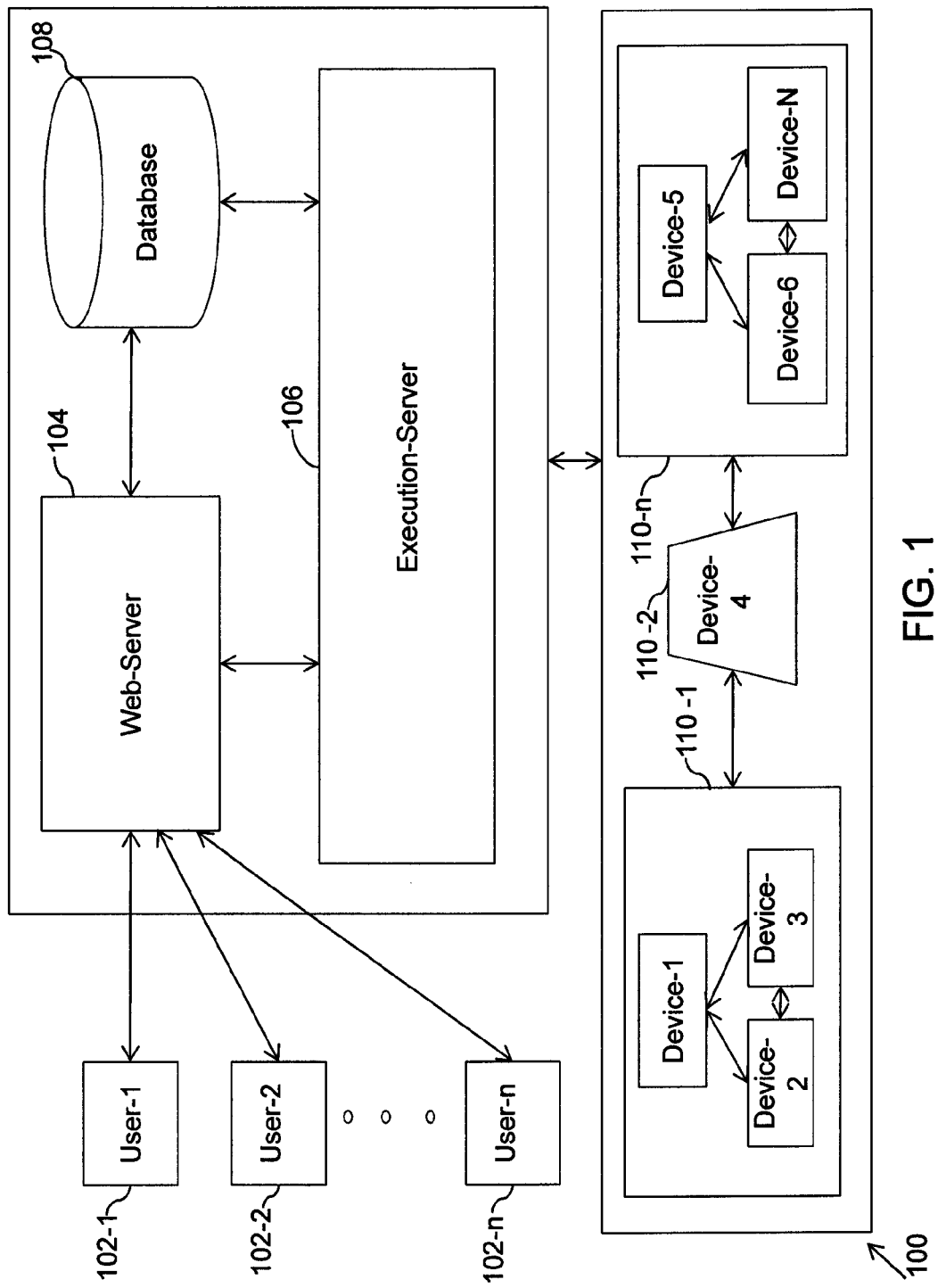
FIG. 1 is an exemplary communication network in which disclosed methods and systems can be practiced.

The systems, methods, and apparatus disclosed herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any features or aspects of the disclosed embodiments can be used in various combinations and sub-combinations with one another. As used in this application and in the claims, the singular forms "a," "an," and "the" include the plural forms unless the context clearly dictates otherwise. Additionally, the term "includes" means "comprises." The term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "receive," "produce," "generate," "associate," "select," "search," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented with computer-executable instructions stored on one or more computer-readable storage devices and/or storage media (e.g., non-transitory computer-readable media, such as one or more volatile memory components (such as DRAM or SRAM), nonvolatile memory components (such as hard drives), magnetic storage, optical storage, or the like) and executed on a computer. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially-available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, JavaScript, Perl, Python, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles, or other theoretical descriptions presented herein in reference to the systems, methods, and apparatus of this disclosure have been provided for the purposes of better understanding and are not intended to be limiting in scope. The systems, methods, and apparatus in the appended claims are not limited to those systems, methods, and apparatus that function in the manner described by such theories of operation.

Disclosed herein are a method, a system, and a computer program product for providing an end-to-end solution in a test automation framework found in a communication network. The communication network can include one or more users who select a test script. The test script can be used to test the functionality of software that may be running on one of a number of devices present in the communication network. The test script can be used to test the functionality of the network services provided by the one or more devices. These network services can be a voice service, a data service, and/or a video service. The method can also include generating a topology by using the devices present in the communication network on which the selected test script is to be executed. The test script can be executed using program codes that are developed and pre-stored for each of, or some of, the test scripts present in the system. Further, the method can also provide a functionality to generate the test scripts from the one or more program codes. In addition to the functionalities above, the method can also include reserving the topology.

FIG. 1 shows an exemplary communication network 100. Communication network 100 can include one or more users 102-1 through 102-n (hereinafter referred to individually as user 102 and collectively as users 102), a web server 104, an execution server 106, a database 108, and one or more devices 110-1 through 110-n (hereinafter referred to collectively as devices 110). Users 102 can use digital devices capable of communicating over communication network 100. Examples of these digital devices can include mobile phones, laptops, personal digital assistants (PDAs), and programmable logic controllers (PLCs). Further, examples of devices 110 present in communication network 100 can include routers, switches, servers, etc. In various embodiments, any desired number of users 102 and devices 110 may participate in communication network 100. Devices 110 can be tested at the time of installation in network 100 and the functionality of its various modules can be tested periodically. In addition to testing devices 110, testing can also be performed for the services running on communication network 100. Further, testing can also include validation of the services and applications running over communication network 100. For testing purposes, a set of test scripts can be used, which can include instructions to be performed on a device 110 under test.

Users 102 can communicate with devices 110 through web server 104 using any suitable client application, such as a web browser configured to communicate with web server 104. For example, users 102 may communicate with web server 104 over a Virtual Private Network (VPN) using the Internet Protocol (IP). In various embodiments of the present invention, communication network 100 may be a local area network (LAN), a wide area network (WAN), a virtual private network (VPN), a satellite network, a wireless network, a wire-line network, a mobile network, or other similar networks.

The test script can used to test the functionality of software running on devices 110 and/or services provided over communication network 100. Additionally, the test script can be used to test the functionality of a set of network services provided by devices 110. These services can comprise a voice service, a data service, and/or a video service. Simplified examples of these services can include broadband, Internet Protocol Television (IPTV), routing, Metro Ethernet, Quality of Service (QoS), access protocols, Multiprotocol Label Switching (MPLS), Data Over Cable Service Interface Specification (DOCSIS), Internet Protocol Multimedia Services (IMS), etc. The web server 104 can be in direct communication with execution server 106, database 108, and a Lightweight Directory Access Protocol (LDAP) directory server (not shown in FIG. 1). The communication network 100 can facilitate test script generation by users 102 and its execution, as discussed in detail below in conjunction with FIGS. 2, 3, and 4.

In some embodiments, web server 104, execution server 106, and database 108 can be separate entities, i.e., they can be on different machines. In other embodiments, web server 104, execution server 106, and database 108 can be on the same machine.

Figure 2:
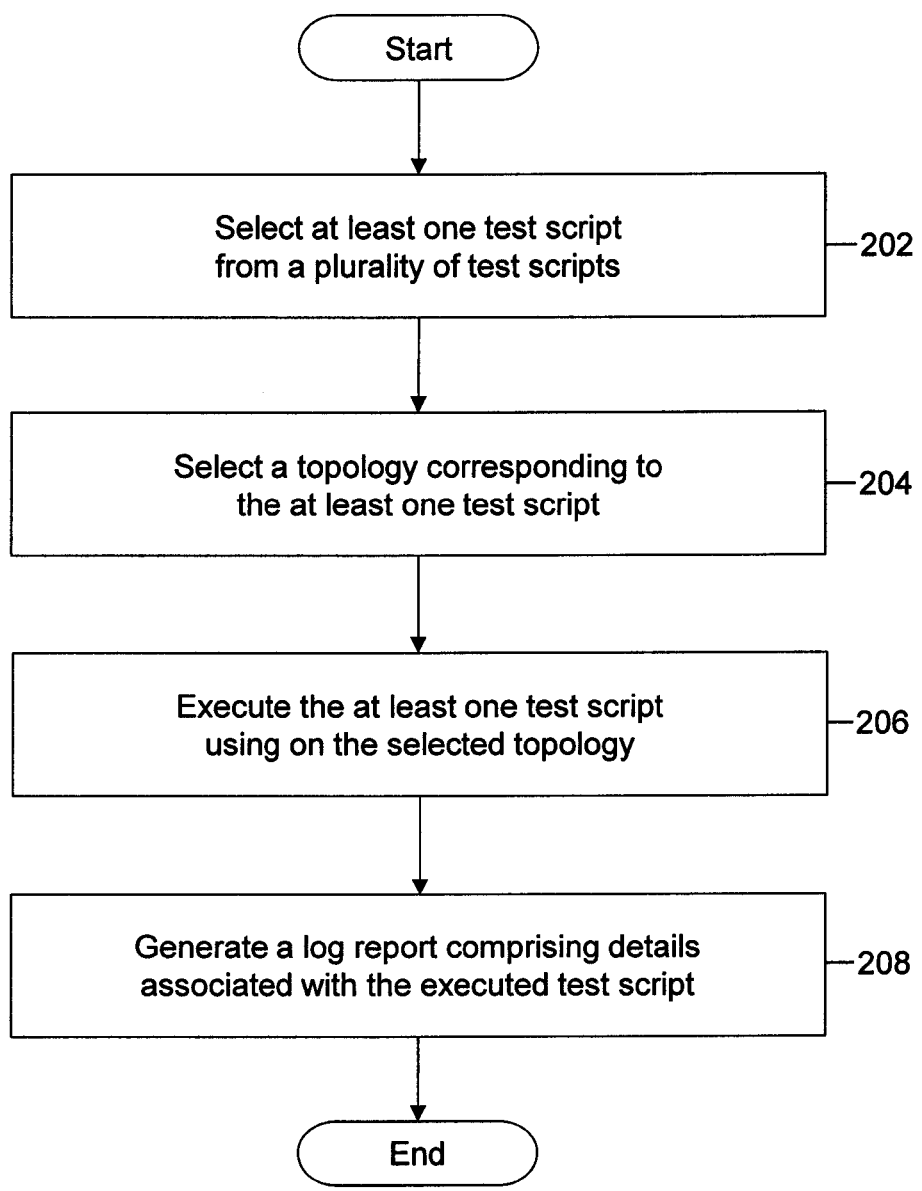
FIG. 2 is a flowchart illustrating an exemplary method for providing an end-to-end solution for automated test execution.

FIG. 2 is a flowchart illustrating an exemplary method for providing an end-to-end solution for automated test execution. One or more users 102 present in communication network 100 can login on web server 104 using a Graphical User Interface (GUI) through one or more remote locations. Web server 104 can provide users 102 authentication to access execution server 106. Further, web server 104 can communicate with the LDAP directory server to provide users 102 a customized view according to their assigned roles and privileges. The roles and privileges can be assigned to users 102 by any conventional method.

When users 102 are logged in on execution server 106 and have a customized view on the GUI of their digital devices, they can select at least one test script from a number of test scripts using the GUI at 202. The at least one test script can be selected corresponding to at least one network service provided by devices 110. Further, as explained in conjunction with FIG. 1, examples of the network services can include, but are not limited to, Internet Protocol Television (IPTV), routing, Metro Ethernet, Quality of Service (QoS), access protocols, Multiprotocol Label Switching (MPLS), Data Over Cable Service Interface Specification (DOCSIS), Internet Protocol Multimedia Services (IMS), etc.

At 204, a topology is selected corresponding to the test script. Typically, a topology is a layout pattern of interconnections of various devices 110 present in communication network 400. In some embodiments of the invention, the topology can be generated prior to its selection. Further, the topology can be reserved for later selections, such as a selection at 204.

The at least one test script selected for the topology can be a collection of one or more program codes and other instructions. These instructions can include the interconnection between the one or more program codes. In other words, the output of a program code can be an input of another program code. The at least one test script can be selected to execute one or more steps on a topology, and each step can be supported by a corresponding program code. Further, these program codes can be stored in the set of predefined libraries.

The set of predefined libraries can be generated using at least one of the following: an external device library, an external test tool library, an infrastructure library, and a custom built library. These external device and test tool libraries can comprise third-party libraries with which the current test automation framework can integrate to generate the set of predefined libraries, or they can comprise custom-built libraries that contain one or more program codes developed by developers and/or system administrators. The set of predefined libraries may be a combination of two or more of the libraries described herein.

The libraries are generated corresponding to the at least one of the network service, i.e., the voice service, the data service, and the video service. These libraries corresponding to the voice service, the data service, and the video service are generated to provide users 102 a device panel with a list of devices 110 available corresponding to each of the particular network service. Further, the library visually differentiates between the lists of devices 110 which are already present and the devices which are added by users 102.

The topology can be generated by dragging and dropping the required devices 110 and connecting them together by users 102. These devices 110 and their corresponding connectors can be preconfigured in the test automation framework. In some embodiments, a system administrator of the test automation framework can update it periodically and add more devices to the framework. Various parameters, such as device name, device configuration, etc., related to devices 110 can be defined to generate a complete topology. Further, selecting the test script can include selecting one or more predefined steps. The selected one or more predefined steps can be executed on the generated topology. Topology generation and selection of one or more predefined steps to be executed on the generated topology is discussed further in conjunction with FIG. 4.

At 206, the at least one test script is executed on, or using, the selected topology. One or more skilled persons, e.g., system administrators, managing the test automation framework can develop the program codes for the at least one test script. In some embodiments, the execution of the selected test script can be scheduled over a predefined time period. For example, a part of the test script that does not require any user 102 input can be scheduled for execution during the night time and a part that requires user 102 input can be scheduled for execution according to the availability of user 102. In other embodiments, a set of test scripts selected by users 102 can be executed concurrently, i.e., at the same time, on the selected topology. In other embodiments, the at least one test script can be executed on more than one topology in parallel. Further, the test execution on these selected topologies can be scheduled for a later point in time.

In case any errors are made during the execution of the test script, a unique ticket number can be generated, e.g., automatically, corresponding to the errors. The unique ticket number can be generated using one or more external defect management module, for example, Bugzilla. Additionally, an alert can be sent to users 102 corresponding to the errors that occurred during the execution of the test script. For instance, an alert can be sent on any digital device that is capable of receiving alerts or text messages and that is configured in the test automation framework by users 102.

At 208, a log report is generated that includes details associated with the executed test script. In some embodiments, the log report can be generated corresponding to one or more levels selected by users 102. The levels can depend on the extent and the type of information required in the log report, and can include, but are not limited to, debug, information, warning, error, and critical. The log reports can be managed and updated in a test management module, after execution of a set of test scripts selected by users 102.

Figure 3:
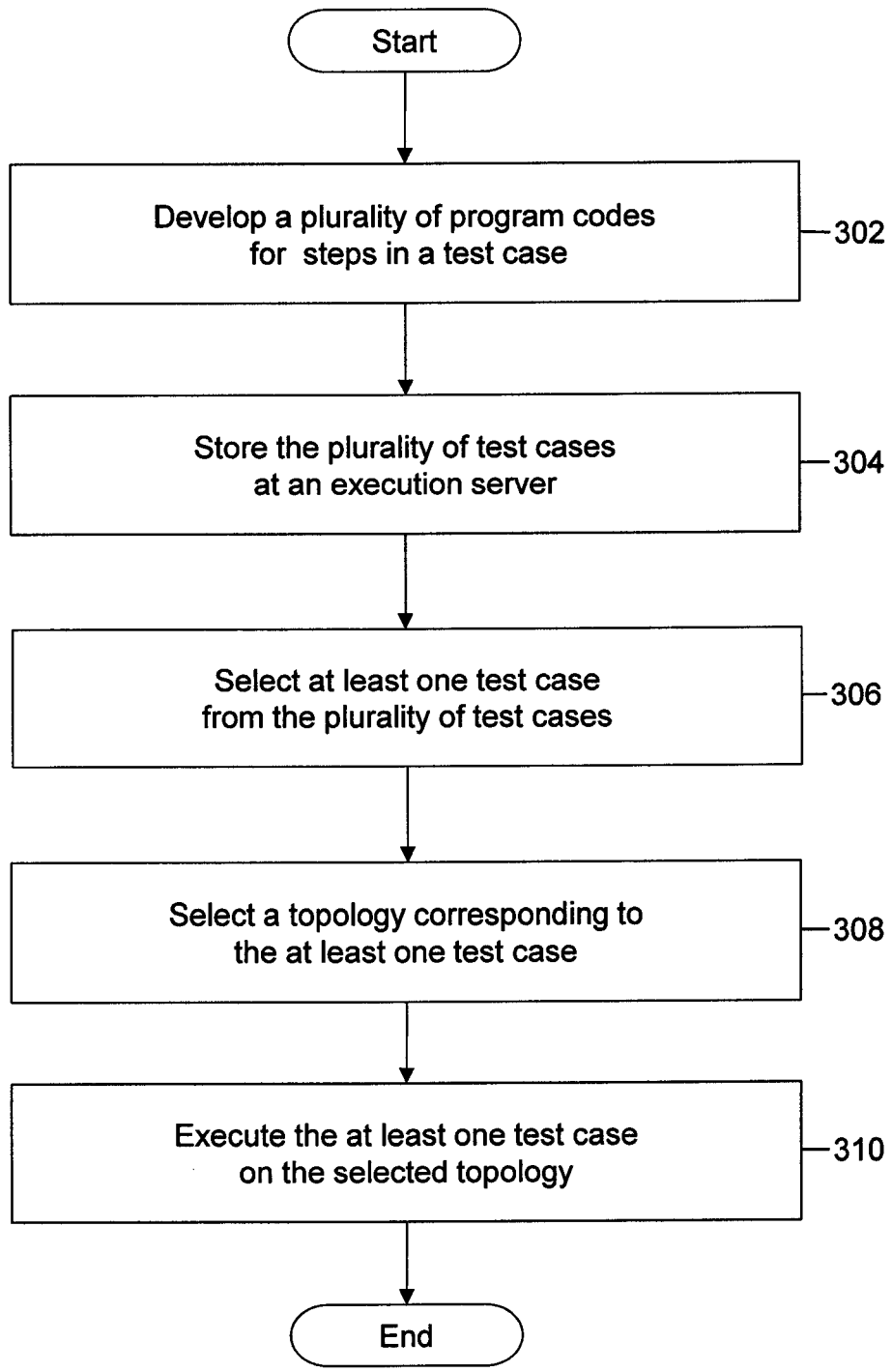
FIG. 3 is flowchart illustrating another exemplary method for providing an end-to-end solution for automated test execution.

FIG. 3 is a flowchart illustrating another exemplary method for providing an end-to-end solution for automated test execution. The illustrated method can be for using a set of test cases stored in the test automation framework. Test scripts can comprise a collection, or set, of test cases developed according to one or more predefined technical standards, such as Internet Engineering Task Force (IETF), Institute of Electrical and Electronics Engineers (IEEE), Metro Ethernet Forum (MEF), Digital Subscriber Line (DSL) Forum, Cable Labs, etc.

At 302, a plurality of program codes are developed for steps in a test case. A test case can comprise a collection of steps required to test a particular service and/or a predefined scenario. Further, each test case can comprise multiple steps, and each test step can have a corresponding program code. The program codes thus developed can be used in other test cases as well and may not be restricted to a single test case.

At 304, the developed test cases are stored at database 108 connected to execution server 106. At 306, users 102 select at least one test case from a number of stored test cases using the GUI of their digital devices. The test case can be selected corresponding to at least one network service provided by devices 110.

At 308, a topology is selected corresponding to at least one test case. In some embodiments, the topology can be generated before its selection. Further, the topology can be reserved before the selection at 308. At 310, the test case is executed on the generated topology. The test cases which are selected and executed on the generated topologies from step 306 to step 310 can correspond to the pre-stored set of test cases that are developed according to one or more predefined standards. The set of these test cases can be updated periodically in the test automation framework by the system administrator based on the requirements of users 102.

For the sake of clarity, the methodologies described in FIGS. 2 and 3 are also described with the help of an example below.

In an illustrative example, a service provider needs to validate VPN services delivered over IP MPLS network. The requirement for testing may further include steps such as creating test topology, configuring devices, validating the configuration, sending traffic with required quality of services, validating the end-to-end traffic flow, and creating the test report. Further, in case of test case failure, a new trouble ticket can be opened on a defect management system (for example, Bugzilla). However, in case the test is executed successfully, results and logs need to be updated to the test management systems, for example, HP-QC. Exemplary stages can include:

Stage 1: User Login

Step 1a—User logs in to the framework using GUI and by providing credentials, such as Username and password Step 1b—The framework validates the credentials against the preconfigured database and provides access to required set of predefined libraries, devices, and test scripts.

Stage 2: Create Test Topology

Step 2a—The user creates a test topology by dragging and dropping the required devices from a preconfigured list and connecting them together. Further, the list of devices, connectors, etc., is preconfigured in the framework. In various embodiments of the invention, the administrator may add as many devices as possible to create the test topology.

Step 2b—The user provides detailed properties of each device and connectors by selecting each one of them and updating the properties fields associated with it. In various embodiments of the invention, the properties of the devices are preconfigured by the system administrator depending on the device.

Step 2c—The user saves the topology using the save option and provides name to identify the topology, such as, Topology1.

Stage 3: Create Test Scripts

Step 3a—The user selects appropriate modules/program codes from the set of predefined libraries for performing each step in the test case. To further elaborate, there may be one or more steps to be performed in the test case, such as Login to Devices CE1, CE2, PE1, PE2, etc. Therefore, to perform these steps, the user selects module "Logintodevice" and provides the name of the device to login as prompted. It may be evident to any person skilled in the art that Devices CE1, CE2, PE1, PE2, etc., may be chosen from devices 110.

Subsequently, another step as per test case may be to configure interfaces on each device. Therefore, to perform this step, the user selects module "ConfigInterface" and provides the configuration details as prompted.

The next step as per the test case may be to verify interfaces configuration. Thus, the user selects appropriate modules from the framework, such as "CheckStatus" and "VerifyInterface" based on the requirement.

Following the verification of the interface configuration, next step as per test case may be to configure the tester for sending traffic stream. In response to this, the user selects appropriate module from tester library to configure traffic stream and provides parameters as prompted.

Once the user appropriately selects the required program codes/modules for each step defined in the test case, he/she may then create test scripts as Step 3b. In an embodiment of the invention, the test scripts are automatically created without any user input. In an exemplary embodiment of the invention, the Web interface may provide the user with a button, such as Click to create test script, to initiate the creation of the test scripts.

Step 3c—The user checks the test case created by the framework. In an embodiment of the invention, the created test script can be edited if required and can be saved again accordingly.

Step 3d—Subsequently, the user uploads the test script to the execution server, such as execution server 106.

In an embodiment of the invention, at stage 4, the user may also reserve test topology for executing the test scripts. The framework will create a lock on the devices used for the topology to ensure that no one else disrupts the topology during the test execution.

Stage 5: Start/Schedule Test Execution.

Step 5a—The user uses the framework for selecting the test case to be executed.

Step 5b—The user selects the topology on which the test case needs to be executed (already created at stage 2).

Step 5c—The user selects the level of log that may be required in the report, such as Debug information, warning, error, critical, etc.

Step 5d—The user runs the test.

In an embodiment of the invention, the test can be scheduled to a later period.

Following the execution of the tests, at Stage 6, the report is viewed.

Step 6a—The user verifies the test result by checking the report generated after the test.

Step 6b—The user updates the test management systems or defect management systems by clicking on the options provided in the framework.

Figure 4:
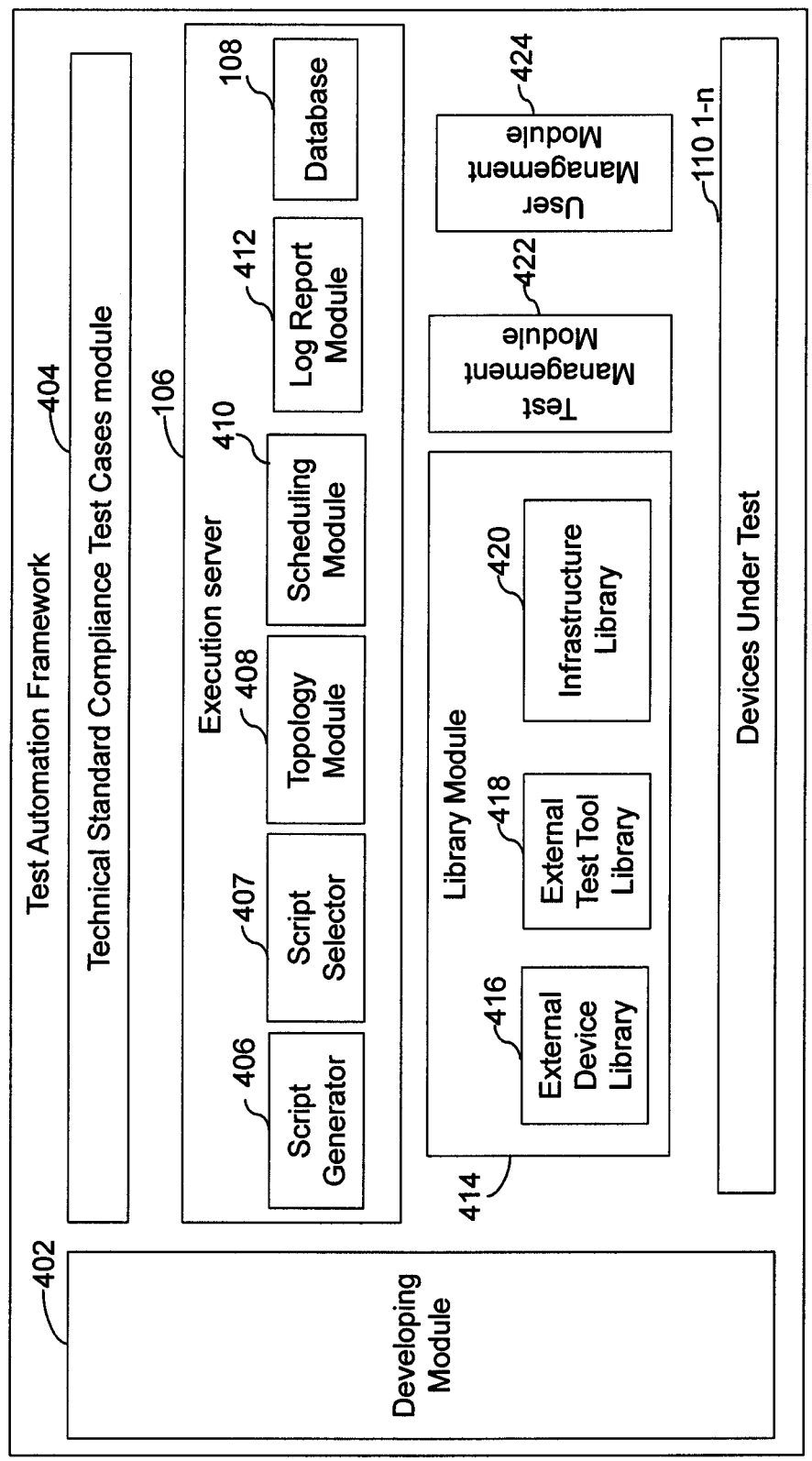
FIG. 4 is a block diagram depicting an exemplary test automation framework.

FIG. 4 is a block diagram depicting the architecture of an exemplary test automation framework 400. Framework 400 can include a developing module 402, a technical standard compliance test cases module 404, execution server 106, a library module 414, a test management module 422, a user management module 424, and devices 110. Execution server 106 can include a script generator 406, a topology module 408, a scheduling module 410, a script selector 407, a log report module 412, and database 108. Further, the library module 414 can include an external device library 416, an external test tool library 418, an infrastructure library 420, and a custom-built library (not shown in the figures).

Developing module 402 can be configured for developing program codes corresponding to test scripts by a set of highly skilled persons, or administrators, managing the test automation framework 400. Further, these program codes can be stored in the custom-built library. The custom-built library is discussed in detail in conjunction with FIG. 1. Test automation framework 400 can further include technical standard compliance test cases module 404 for developing and storing a set of test cases which are developed according to one or more predefined technical standards.

The execution server 106 can include script generator 406 that generates the test scripts following the selection of the program codes for each step mentioned in a test case. In some embodiments, a GUI can facilitate the selection of one or more program codes for each step mentioned in the test case. Further, the same program codes can also be used later for generating other test scripts. Further, the test script can be selected corresponding to the at least one service provided by devices 110. In some embodiments, the service can include at least one of the following: a voice service, a data service, and a video service.

Following the generation of test scripts, script selector 407 can facilitate users 102 to select the test scripts. In some embodiments, script selector 407 can select the test scripts that have been generated by script generator 406. In other embodiments, script selector 407 can select the test scripts that were manually written/coded and stored in technical standard compliance test cases module 404.

Thereafter, users 102 can select a topology corresponding to selected test script thorough topology module 408. In some embodiments, topology module 408 can also be configured for generating the topology. These generated topologies can be later used by users 102 for testing purposes.

A set of predefined libraries can be generated by library module 414, which can use at least one of external device library 416, external test tool library 418, and infrastructure library 420. Additionally, topology module 408 can include a topology reserve module (not shown in the FIG. 4) which can be configured for reserving the topology for a predetermined time interval.

Execution server 106 can be configured for executing the test script on the selected topology. Execution server 106 can includes database 108 and log report module 412. Log report module 412 can be configured for generating a log report comprising details associated with the executed test script. The log report can be generated corresponding to a level selected by users 102. Further, log report module 412 can be configured for managing the log report after execution of the test scripts selected by users 102. Database 106 can be used to store the log reports which are generated after the execution of the test scripts. In some embodiments, database 108 can be situated at a remote location and can be physically separated but logically connected to execution server 106 (as shown in FIG. 1).

Execution server 106 can further include scheduling module 410, which can be configured for scheduling the execution of the selected test script over a predefined time period. For example, a part of the test script that does not require any user 102 input can be scheduled for execution during the night time and the part that requires user 102 inputs can be scheduled for execution according to the availability of user 102.

Test automation framework 400 can further include test management module 422, on which the log reports of the test scripts that are executed without any errors can be uploaded. Test management module 422 can act as an intelligent system that has complete information related to each and every step of the executed test. In case an error has occurred during the execution of the test, test management module 422 can comprise complete information related to the error, for example, how and when the error occurred and the procedure by which it was corrected. In some embodiments, test automation framework 400 can integrate with external test management module 422 such as HP-QC.

User management module 424 can be configured to provide each of one or more users 102 the authentication and access to test automation framework 400. User management module 424 can use the LDAP directory server to provide users 102 a customized view according to their roles and privileges assigned. These roles and privileges can be assigned to users 102 by any conventional method.

The method and the system described herein can have various advantages, such as one or more of the following advantages. First, disclosed methods and systems can provide an end-to-end solution in a test automation framework. The framework can provide testing solutions corresponding to multiple network services to the users present in the communication network. These network services can be classified into multiple domains such as voice, data, and video. Further, disclosed methods and the systems can provide testing solutions for devices from multiple vendors and can integrate with various external test and defect management modules. The integration with the various external test and defect management modules can provide easy management of executed tests and a proper error or bug tracking system.

Additionally, disclosed methods and the systems can minimize the user's effort by enabling the user to create test scripts or test cases without any scripting knowledge. The user present in the communication network can create a test script by simply dragging and dropping icons rendered on his/her GUI. Further, disclosed systems and methods can provide a complete testing solution to the users by covering all phases of a testing lifecycle.

In various embodiments, developing module 402, technical standard compliance test cases module 404, execution server 106, library module 414, test management module 422, user management module 424, devices 110, script generator 406, topology module 408, scheduling module 410, log report module 412 and database 108 of execution server 106, external device library 416, external test tool library 418, and/or infrastructure library 420 of library module 414 can be implemented in the form of hardware, software, firmware, and/or combinations thereof.

The disclosed systems and methods, or any of their components, may be embodied in the form of a computer system. Examples of a computer system can include a general-purpose computer, a programmed microprocessor, a micro-controller, a peripheral integrated circuit element, and other devices or arrangements of devices that are capable of implementing the disclosed methods and/or systems.

The computer system can comprise a computer, one or more input devices, one or more display units, and the Internet. The computer can further comprise a microprocessor, which is connected to a communication bus. The computer can also include memory, which may include Random Access Memory (RAM) and Read Only Memory (ROM). It can also comprise one or more storage devices, which can comprise a hard disk drive or a removable storage drive such as a floppy disk drive and an optical disk drive. The storage device can also be other similar means for loading computer programs or other instructions into the computer system. The computer system can also include one or more communication units, which enable the computer to connect to other databases and the Internet through an Input/Output (I/O) interface. The communication unit enables the transfer as well as reception of data from other databases. The communication unit can include a modem, an Ethernet card, or any similar device, which enable the computer system to connect to databases and networks such as Local Area Network (LAN), Metropolitan Area Network (MAN), Wide Area Network (WAN), and the Internet. The computer system facilitates inputs from a user through an input device which is accessible to the system through an I/O interface.

The computer system can execute a set of instructions stored in one or more storage elements to process the input data. The storage elements can also hold data or other information as desired. The storage element may be in the form of an information source or a physical memory element present in the processing machine.

Disclosed embodiments can also be embodied in a computer program product. The computer program product can include one or more computer readable media having a set of program instructions stored thereon comprising computer-executable program code for providing an end-to-end solution in a test automation framework. The set of instructions can include various commands that instruct the processing machine to perform specific tasks such as any of the disclosed methods. The set of instructions can be in the form of a software program. Further, the software can be in the form of a collection of separate programs and a program module with a large program or a portion of a program module. The software can also include modular programming in the form of object-oriented programming. The processing of input data by the processing machine can be in response to user commands, results of previous processing, or a request made by another processing machine.

Any of the methods described herein can be implemented by computer-executable instructions stored in one or more computer-readable storage devices (e.g., memory, magnetic storage, optical storage, or the like). Such instructions can cause a computer to perform the method.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method for providing an end-to-end solution in a test automation framework present in a communication network, wherein the communication network comprises a plurality of interconnected devices and network connections, the interconnected devices and network connections enabling provision of at least one network service, the method comprising:
   a. user selection through a graphical user interface, of a test script from among a plurality of test scripts, wherein the selected test script defines test steps for testing a network service comprising at least one selected from the group consisting of a voice service, a data service, and, a video service;
   b. user selection of a set of devices and network connections from among the plurality of interconnected devices and network connections within the communication network, wherein the selected set of devices and network connections forms a topology for execution of the selected test script, wherein after forming the topology, a test topology is reserved for a pre-defined time interval, by creating a lock on devices to prevent disruption of the test topology by other users during the test execution;
   c. executing the selected test script on the selected topology; and
   d. generating a log report comprising details associated with the executed test script.

2. The method according to claim 1, further comprising receiving user inputs defining a plurality of topologies, each defined topology comprising a combination of interconnected devices and network connections within the communication network, wherein each topology is defined to test a network service.

3. The method according to claim 1, further comprising login by a user using the graphical user interface from a remote location.

4. The method according to claim 1, wherein the selected test script comprises program code retrieved from a set of predefined libraries comprising at least one of an external device library, an external test tool library, an infrastructure library, and a custom built library.

5. The method according to claim 4, wherein the set of predefined libraries comprises program code for testing voice services, data services, and video services.

6. The method according to claim 2, wherein defining a topology comprises defining one or more parameters related to the interconnected devices within the topology.

7. The method according to claim 1, wherein selecting the test script comprises selecting one or more predefined test steps for testing of the network service.

8. The method according to claim 1, wherein the log report is generated corresponding to one or more levels selected by a user.

9. The method according to claim 1, further comprising managing the log report after execution of the selected test script.

10. The method according to claim 1, further comprising scheduling the execution of the selected test script over a predefined time period.

11. The method according to claim 1, further comprising executing a set of selected test scripts concurrently on the topology.

12. The method according to claim 1, further comprising automatically generating a unique ticket number corresponding to one or more errors that occur during the execution of the selected test script, wherein the unique ticket number is generated using one or more external defect management modules.

13. The method according to claim 1, further comprising sending an alert to a user, corresponding to one or more errors that occur during the execution of the selected test script.

14. A method for providing an end-to-end solution in a test automation framework present in a communication network, wherein the communication network comprises a plurality of interconnected devices and network connections, the interconnected devices and network connections enabling provision of at least one network service, the method comprising:
 a. providing program code defining test steps of a test case for testing network services, wherein the program code is developed according to one or more predefined technical standards;
 b. storing a plurality of developed test cases at an execution server;
 c. user selection through a graphical user interface, a test case from among the plurality of developed test cases, wherein the selected test case defines test steps for testing a network service comprising at least one of: a voice service, a data service, and a video service;
 d. selecting a set of devices and network connections from among the plurality of interconnected devices and network connections within the communication network, wherein the selected set of devices and network connections forms a topology for execution of the selected test case, wherein after forming the topology, the topology is reserved for a pre-defined time interval, by creating a lock on the selected set of devices and network connections forming the topology to prevent disruption of the topology by other users during the test execution;
 e. executing developed program code corresponding to the selected test case on the topology; and
 f. generating a log report comprising details associated with the executed test script.

15. The method according to claim 14, wherein the program code defining steps of a test case is retrieved from a set of predefined libraries comprising at least one of an external device library, an external test tool library, an infrastructure library, and a custom-built library.

16. The method according to claim 15, wherein the set of predefined libraries comprises program code for testing voice services, data services, and video services.

17. The method according to claim 14, further comprising providing a user, a predefined set of test cases corresponding to the at least one of a voice service, data service, and video service.

18. The method according to claim 14, further comprising receiving user inputs defining a plurality of topologies, each defined topology comprising a combination of interconnected devices and network connections within the communication network, wherein each topology is defined to test a network service.

19. A system for providing an end-to-end solution in a test automation framework present in a communication network, wherein the communication network comprises a plurality of interconnected devices and network connections, the interconnected devices and network connections enabling provision of at least one network service, the system comprising: a processor configured to execute:
 a) a script generator configured for: i. obtaining program code defining test steps of a test case for testing network services, and ii. generating a test script based on the obtained program code;
 b) a script selector configured for receiving through a graphical user interface, user input selecting a test script from among a plurality of generated test scripts, wherein the selected test script defines test steps for testing a network service comprising at least one of a voice service, a data service, and a video service; and
 c) a topology module configured for receiving user input selecting a set of devices and network connections from among the plurality of interconnected devices and network connections within the communication network, wherein the selected set of devices and network connections forms a topology for execution of the selected test script, wherein after forming the topology, the topology is reserved for a pre-defined time interval, by creating a lock on the selected set of devices and network connections forming the topology to prevent disruption of the topology by other users during the test execution; and an execution server configured for:
  i. executing the selected test script on the topology, and
  ii. generating a log report comprising details associated with the executed test script.

20. The system according to claim 19, further comprising a library module, the library module comprising at least one selected from the group consisting of: an external device library, an external test tool library, an infrastructure library, and a custom-built library.

21. The system according to claim 19, further comprising a scheduling module configured for scheduling the execution of the selected test script over a predefined time period.

22. The system according to claim 19, wherein the log report module is further configured for managing the log report after execution of a selected set of test scripts.

23. The system according to claim 19, wherein the script selector is configured to select a test script from a set of predefined libraries comprising program code for testing voice services, data services and video services.

24. A computer program product for use with a computer, the computer program product comprising a non-transitory computer readable medium having a computer executable program code embodied therein for providing an end-to-end solution in a test automation framework present in a communication network, wherein the communication network comprises a plurality of interconnected devices and network connections, the interconnected devices and network connections enabling provision of at least one network service, the computer executable program code performing the steps of:
 a. receiving through a graphical user interface, a user selection of a test script from among a plurality of test scripts, wherein the selected test script defines test steps for testing a network service comprising at least one selected from the group consisting of a voice service, a data service, and a video service;
 b. receiving a user selection of a set of devices and network connections from among the plurality of interconnected devices and network connections within the communication network, wherein the selected set of devices and network connections forms a topology for execution of the selected test script, wherein after forming the topology, the topology is reserved for a pre-defined time interval, by creating a lock on the selected set of devices and network connections forming the topology to prevent disruption of the topology by other users during the test execution;

c. executing the selected test script on the topology; and d. generating a log report comprising details associated with the executed test script.

25. The computer program product according to claim 24, wherein the selected test script comprises program code retrieved from a set of predefined libraries comprising at least one of an external device library, an external test tool library, an infrastructure library, and a custom-built library.

26. The computer program product according to claim 25, wherein the set of predefined libraries comprises program code for testing voice services, data services and video services.

27. The computer program product according to claim 24, further comprising program code scheduling execution of the selected test script over a predefined time period.

28. The computer program product according to claim 24, further comprising program code executing a selected set of test scripts concurrently on the topology.

* * * * *